(12) United States Patent
Clark

(10) Patent No.: US 9,071,106 B2
(45) Date of Patent: Jun. 30, 2015

(54) ARMATURE WINDINGS

(75) Inventor: Paul Eaton Clark, Warwickshire (GB)

(73) Assignee: GE Energy Power Conversion Technology Limited, Warwickshire (GB)

( * ) Notice: Subject to any disclaimer, the term of this patent is extended or adjusted under 35 U.S.C. 154(b) by 742 days.

(21) Appl. No.: 13/384,258

(22) PCT Filed: Jul. 29, 2010

(86) PCT No.: PCT/EP2010/004690
§ 371 (c)(1),
(2), (4) Date: Mar. 8, 2012

(87) PCT Pub. No.: WO2011/015317
PCT Pub. Date: Feb. 10, 2011

(65) Prior Publication Data
US 2012/0187795 A1 Jul. 26, 2012

(30) Foreign Application Priority Data
Aug. 3, 2009 (EP) .................................... 09009967

(51) Int. Cl.
*H02K 3/28* (2006.01)
*H02K 3/20* (2006.01)
(52) U.S. Cl.
CPC .. *H02K 3/28* (2013.01); *H02K 3/20* (2013.01); *Y02E 10/725* (2013.01)
(58) Field of Classification Search
USPC ......................................... 310/184, 195, 198
IPC ....................................................... H02K 3/28
See application file for complete search history.

(56) References Cited

U.S. PATENT DOCUMENTS

| 6,335,582 | B1* | 1/2002 | Abukawa et al. ............. 310/214 |
| 6,759,780 | B2* | 7/2004 | Liu et al. ....................... 310/184 |
| 7,388,311 | B2* | 6/2008 | Bhargava ...................... 310/184 |
| 2007/0194650 | A1 | 8/2007 | Ito et al. | |

FOREIGN PATENT DOCUMENTS

| CN | 101026317 A | 8/2007 |
| EP | 1916176 A1 | 4/2008 |
| EP | 2058924 A2 | 5/2009 |

OTHER PUBLICATIONS

The translated Chinese Office Action issued in connection with corresponding CN Patent Application No. 201080034147.2 dated on Jun. 26, 2013.

* cited by examiner

Primary Examiner — Dang Le
(74) Attorney, Agent, or Firm — Parks Wood LLC

(57) ABSTRACT

The present invention relates to armature windings for DC electrical machines, and in particular to those that use electronic commutation and have relatively few slots per pole-pair. The armature windings are particularly well suited for use with rotating DC electrical machines that have a large diameter and a large number of poles such as those that might be directly coupled to the turbine blade assembly of a wind turbine. The armature winding is arranged in relation to the magnetic field generated by a field winding or by permanent magnets such that a number of commutation events during the time taken for the relative movement between the armature and the field system of one pole-pair is much larger than the number of coils per pole-pair.

10 Claims, 3 Drawing Sheets

| First circuit | | Second circuit | | Third circuit | | Fourth circuit | |
|---|---|---|---|---|---|---|---|
| Coil | Slots | Coil | Slots | Coil | Slots | Coil | Slots |
| A1 | 1 4 | B1 | 73 76 | C1 | 145 148 | D1 | 217 220 |
| A2 | 27 30 | B2 | 99 102 | C2 | 171 174 | D2 | 243 246 |
| A3 | 53 56 | B3 | 125 128 | C3 | 197 200 | D3 | 269 272 |
| A4 | 79 82 | B4 | 151 154 | C4 | 223 226 | D4 | 7 10 |
| A5 | 105 108 | B5 | 177 180 | C5 | 249 252 | D5 | 33 36 |
| A6 | 131 134 | B6 | 203 206 | C6 | 275 278 | D6 | 59 62 |
| A7 | 157 160 | B7 | 229 232 | C7 | 13 16 | D7 | 85 88 |
| A8 | 183 186 | B8 | 255 258 | C8 | 39 42 | D8 | 111 114 |
| A9 | 209 212 | B9 | 281 284 | C9 | 65 68 | D9 | 137 140 |
| A10 | 235 238 | B10 | 19 22 | C10 | 91 94 | D10 | 163 166 |
| A11 | 261 264 | B11 | 45 48 | C11 | 117 120 | D11 | 189 192 |
| A12 | 287 2 | B12 | 71 74 | C12 | 143 146 | D12 | 215 218 |
| A13 | 25 28 | B13 | 97 100 | C13 | 169 172 | D13 | 241 244 |
| A14 | 51 54 | B14 | 123 126 | C14 | 195 198 | D14 | 267 270 |
| A15 | 77 80 | B15 | 149 152 | C15 | 221 224 | D15 | 5 8 |
| A16 | 103 106 | B16 | 175 178 | C16 | 247 250 | D16 | 31 34 |
| A17 | 129 132 | B17 | 201 204 | C17 | 273 276 | D17 | 57 60 |
| A18 | 155 158 | B18 | 227 230 | C18 | 11 14 | D18 | 83 86 |
| A19 | 181 184 | B19 | 253 256 | C19 | 37 40 | D19 | 109 112 |
| A20 | 207 210 | B20 | 279 282 | C20 | 63 66 | D20 | 135 138 |
| A21 | 233 236 | B21 | 17 20 | C21 | 89 92 | D21 | 161 164 |
| A22 | 259 262 | B22 | 43 46 | C22 | 115 118 | D22 | 187 190 |
| A23 | 285 288 | B23 | 69 72 | C23 | 141 144 | D23 | 213 216 |
| A24 | 23 26 | B24 | 95 98 | C24 | 167 170 | D24 | 239 242 |
| A25 | 49 52 | B25 | 121 124 | C25 | 193 196 | D25 | 265 268 |
| A26 | 75 78 | B26 | 147 150 | C26 | 219 222 | D26 | 3 6 |
| A27 | 101 104 | B27 | 173 176 | C27 | 245 248 | D27 | 29 32 |
| A28 | 127 130 | B28 | 199 202 | C28 | 271 274 | D28 | 55 58 |
| A29 | 153 156 | B29 | 225 228 | C29 | 9 12 | D29 | 81 84 |
| A30 | 179 182 | B30 | 251 254 | C30 | 35 38 | D30 | 107 110 |
| A31 | 205 208 | B31 | 277 280 | C31 | 61 64 | D31 | 133 136 |
| A32 | 231 234 | B32 | 15 18 | C32 | 87 90 | D32 | 159 162 |
| A33 | 257 260 | B33 | 41 44 | C33 | 113 116 | D33 | 185 188 |
| A34 | 283 286 | B34 | 67 70 | C34 | 139 142 | D34 | 211 214 |
| A35 | 21 24 | B35 | 93 96 | C35 | 165 168 | D35 | 237 240 |
| A36 | 47 50 | B36 | 119 122 | C36 | 191 194 | D36 | 263 266 |

Table 1 – Distributed connection armature winding

| First circuit | | Second circuit | | Third circuit | | Fourth circuit | |
|---|---|---|---|---|---|---|---|
| Coil | Slots | Coil | Slots | Coil | Slots | Coil | Slots |
| A1 | 1 | 4 | B1 | 73 | 76 | C1 | 145 | 148 | D1 | 217 | 220 |
| A2 | 27 | 30 | B2 | 99 | 102 | C2 | 171 | 174 | D2 | 243 | 246 |
| A3 | 53 | 56 | B3 | 125 | 128 | C3 | 197 | 200 | D3 | 269 | 272 |
| A4 | 79 | 82 | B4 | 151 | 154 | C4 | 223 | 226 | D4 | 7 | 10 |
| A5 | 105 | 108 | B5 | 177 | 180 | C5 | 249 | 252 | D5 | 33 | 36 |
| A6 | 131 | 134 | B6 | 203 | 206 | C6 | 275 | 278 | D6 | 59 | 62 |
| A7 | 157 | 160 | B7 | 229 | 232 | C7 | 13 | 16 | D7 | 85 | 88 |
| A8 | 183 | 186 | B8 | 255 | 258 | C8 | 39 | 42 | D8 | 111 | 114 |
| A9 | 209 | 212 | B9 | 281 | 284 | C9 | 65 | 68 | D9 | 137 | 140 |
| A10 | 235 | 238 | B10 | 19 | 22 | C10 | 91 | 94 | D10 | 163 | 166 |
| A11 | 261 | 264 | B11 | 45 | 48 | C11 | 117 | 120 | D11 | 189 | 192 |
| A12 | 287 | 2 | B12 | 71 | 74 | C12 | 143 | 146 | D12 | 215 | 218 |
| A13 | 25 | 28 | B13 | 97 | 100 | C13 | 169 | 172 | D13 | 241 | 244 |
| A14 | 51 | 54 | B14 | 123 | 126 | C14 | 195 | 198 | D14 | 267 | 270 |
| A15 | 77 | 80 | B15 | 149 | 152 | C15 | 221 | 224 | D15 | 5 | 8 |
| A16 | 103 | 106 | B16 | 175 | 178 | C16 | 247 | 250 | D16 | 31 | 34 |
| A17 | 129 | 132 | B17 | 201 | 204 | C17 | 273 | 276 | D17 | 57 | 60 |
| A18 | 155 | 158 | B18 | 227 | 230 | C18 | 11 | 14 | D18 | 83 | 86 |
| A19 | 181 | 184 | B19 | 253 | 256 | C19 | 37 | 40 | D19 | 109 | 112 |
| A20 | 207 | 210 | B20 | 279 | 282 | C20 | 63 | 66 | D20 | 135 | 138 |
| A21 | 233 | 236 | B21 | 17 | 20 | C21 | 89 | 92 | D21 | 161 | 164 |
| A22 | 259 | 262 | B22 | 43 | 46 | C22 | 115 | 118 | D22 | 187 | 190 |
| A23 | 285 | 288 | B23 | 69 | 72 | C23 | 141 | 144 | D23 | 213 | 216 |
| A24 | 23 | 26 | B24 | 95 | 98 | C24 | 167 | 170 | D24 | 239 | 242 |
| A25 | 49 | 52 | B25 | 121 | 124 | C25 | 193 | 196 | D25 | 265 | 268 |
| A26 | 75 | 78 | B26 | 147 | 150 | C26 | 219 | 222 | D26 | 3 | 6 |
| A27 | 101 | 104 | B27 | 173 | 176 | C27 | 245 | 248 | D27 | 29 | 32 |
| A28 | 127 | 130 | B28 | 199 | 202 | C28 | 271 | 274 | D28 | 55 | 58 |
| A29 | 153 | 156 | B29 | 225 | 228 | C29 | 9 | 12 | D29 | 81 | 84 |
| A30 | 179 | 182 | B30 | 251 | 254 | C30 | 35 | 38 | D30 | 107 | 110 |
| A31 | 205 | 208 | B31 | 277 | 280 | C31 | 61 | 64 | D31 | 133 | 136 |
| A32 | 231 | 234 | B32 | 15 | 18 | C32 | 87 | 90 | D32 | 159 | 162 |
| A33 | 257 | 260 | B33 | 41 | 44 | C33 | 113 | 116 | D33 | 185 | 188 |
| A34 | 283 | 286 | B34 | 67 | 70 | C34 | 139 | 142 | D34 | 211 | 214 |
| A35 | 21 | 24 | B35 | 93 | 96 | C35 | 165 | 168 | D35 | 237 | 240 |
| A36 | 47 | 50 | B36 | 119 | 122 | C36 | 191 | 194 | D36 | 263 | 266 |

Table 1 – Distributed connection armature winding

Fig. 2

First circuit | Second circuit | Third circuit | Fourth circuit

| Coil | Slots | | Coil | Slots | | Coil | Slots | | Coil | Slots | |
|---|---|---|---|---|---|---|---|---|---|---|---|
| A1 | 1 | 4 | B1 | 73 | 76 | C1 | 145 | 148 | D1 | 217 | 220 |
| A2 | 27 | 30 | B2 | 99 | 102 | C2 | 171 | 174 | D2 | 243 | 246 |
| A3 | 53 | 56 | B3 | 125 | 128 | C3 | 197 | 200 | D3 | 269 | 272 |
| A4 | 7 | 10 | B4 | 79 | 82 | C4 | 151 | 154 | D4 | 223 | 226 |
| A5 | 33 | 36 | B5 | 105 | 108 | C5 | 177 | 180 | D5 | 249 | 252 |
| A6 | 59 | 62 | B6 | 131 | 134 | C6 | 203 | 206 | D6 | 275 | 278 |
| A7 | 13 | 16 | B7 | 85 | 88 | C7 | 157 | 160 | D7 | 229 | 232 |
| A8 | 39 | 42 | B8 | 111 | 114 | C8 | 183 | 186 | D8 | 255 | 258 |
| A9 | 65 | 68 | B9 | 137 | 140 | C9 | 209 | 212 | D9 | 281 | 284 |
| A10 | 19 | 22 | B10 | 91 | 94 | C10 | 163 | 166 | D10 | 235 | 238 |
| A11 | 45 | 48 | B11 | 117 | 120 | C11 | 189 | 192 | D11 | 261 | 264 |
| A12 | 71 | 74 | B12 | 143 | 146 | C12 | 215 | 218 | D12 | 287 | 2 |
| A13 | 25 | 28 | B13 | 97 | 100 | C13 | 169 | 172 | D13 | 241 | 244 |
| A14 | 51 | 54 | B14 | 123 | 126 | C14 | 195 | 198 | D14 | 267 | 270 |
| A15 | 5 | 8 | B15 | 77 | 80 | C15 | 149 | 152 | D15 | 221 | 224 |
| A16 | 31 | 34 | B16 | 103 | 106 | C16 | 175 | 178 | D16 | 247 | 250 |
| A17 | 57 | 60 | B17 | 129 | 132 | C17 | 201 | 204 | D17 | 273 | 276 |
| A18 | 11 | 14 | B18 | 83 | 86 | C18 | 155 | 158 | D18 | 227 | 230 |
| A19 | 37 | 40 | B19 | 109 | 112 | C19 | 181 | 184 | D19 | 253 | 256 |
| A20 | 63 | 66 | B20 | 135 | 138 | C20 | 207 | 210 | D20 | 279 | 282 |
| A21 | 17 | 20 | B21 | 89 | 92 | C21 | 161 | 164 | D21 | 233 | 236 |
| A22 | 43 | 46 | B22 | 115 | 118 | C22 | 187 | 190 | D22 | 259 | 262 |
| A23 | 69 | 72 | B23 | 141 | 144 | C23 | 213 | 216 | D23 | 285 | 288 |
| A24 | 23 | 26 | B24 | 95 | 98 | C24 | 167 | 170 | D24 | 239 | 242 |
| A25 | 49 | 52 | B25 | 121 | 124 | C25 | 193 | 196 | D25 | 265 | 268 |
| A26 | 3 | 6 | B26 | 75 | 78 | C26 | 147 | 150 | D26 | 219 | 222 |
| A27 | 29 | 32 | B27 | 101 | 104 | C27 | 173 | 176 | D27 | 245 | 248 |
| A28 | 55 | 58 | B28 | 127 | 130 | C28 | 199 | 202 | D28 | 271 | 274 |
| A29 | 9 | 12 | B29 | 81 | 84 | C29 | 153 | 156 | D29 | 225 | 228 |
| A30 | 35 | 38 | B30 | 107 | 110 | C30 | 179 | 182 | D30 | 251 | 254 |
| A31 | 61 | 64 | B31 | 133 | 136 | C31 | 205 | 208 | D31 | 277 | 280 |
| A32 | 15 | 18 | B32 | 87 | 90 | C32 | 159 | 162 | D32 | 231 | 234 |
| A33 | 41 | 44 | B33 | 113 | 116 | C33 | 185 | 188 | D33 | 257 | 260 |
| A34 | 67 | 70 | B34 | 139 | 142 | C34 | 211 | 214 | D34 | 283 | 286 |
| A35 | 21 | 24 | B35 | 93 | 96 | C35 | 165 | 168 | D35 | 237 | 240 |
| A36 | 47 | 50 | B36 | 119 | 122 | C36 | 191 | 194 | D36 | 263 | 266 |

Table 2 – Alternative distributed connection armature winding

Fig. 3

ARMATURE WINDINGS

FIELD OF THE INVENTION

The present invention relates to armature windings for DC electrical machines, and in particular to those that use electronic commutation and have relatively few coils per pole-pair. The armature windings are particularly well suited for use with rotating electrical machines that have a large diameter and a large number of poles such as those that might be directly coupled to the turbine blade assembly of a wind turbine.

BACKGROUND OF THE INVENTION

A DC rotating electrical machine typically includes an armature winding mounted on the rotor surrounded by a field system mounted on the stator. A rotor-connected commutator with copper or copper alloy segments and stationary brushgear are used to control the commutation of current in the rotor winding based on the angular position of the rotor. In a further development of the DC rotating electrical machine, the armature winding is mounted on the stator and the field system is mounted on the rotor. An electronic switching circuit is used to control the commutation of current in the armature winding in relation to the angular position of the rotor. The following description is based on a DC rotating electrical machine having this construction.

The armature winding will include a plurality of coils that are located in winding slots formed in a surface of the armature assembly. The rotor provides a rotating magnetic field and this can be generated by permanent magnets, superconducting windings with a suitable excitation power supply or conventional windings with slip rings or brushless excitation power supply. Electrical machines using electronic commutation may operate at much higher voltages (voltages of several kV are possible) and proportionally lower currents than conventional electrical machines that use brushes.

DC rotating electrical machines employing electronic commutation may be used as generators for wind turbine applications. A turbine blade assembly may be used to drive the rotor of the generator, either directly or by means of a gearbox. If the rotor is connected directly to the turbine blade assembly then the generator will run at very low speeds and, in order to minimise the amount of ineffective copper in the endwindings of the coils, to minimise the amount of magnetic steel that is required and to simplify construction, the generator will normally have a very large number of poles (typically 50 or more for the largest generators) and a very small number of slots per pole-pair.

An armature winding with n coils per pole-pair would require only n commutating events during the time taken for the relative movement between the armature and the field system of one pole-pair. For simplicity this is referred to as the number of commutating events per pole-pair. The number of commutating events per pole-pair in a conventional DC rotating electrical machine is equal to the number of coils per pole-pair and n is not necessarily an integer.

The purpose of the present invention is to provide an improved armature winding that allows a much larger number of commutation events per pole-pair than the number of coils per pole-pair.

SUMMARY OF THE INVENTION

The present invention provides a DC electrical machine comprising: field means for providing a magnetic field having at least one pole-pair; an armature having a non-integer number of winding slots per pole-pair, each winding slot having a phase angle being the position of the winding slot in relation to a fundamental waveform of the magnetic field; and a DC armature winding that in use interacts with the magnetic field, the armature winding comprising one or more circuits with each circuit including a plurality of coils; wherein each coil of the armature winding is received in a pair of winding slots; wherein each coil of the armature winding has a phase angle that is the average of the phase angles of the pair of winding slots in which the respective coil is received and the coils in each circuit that have different phase angles at any instant form different phases for the armature winding, the number of different phases for the armature winding being at least twice the number of coils per pole-pair; and wherein the coils in each circuit are connected together in series in the sequence of their phase angles and are separated from adjacent coils in the same circuit by a number of winding slots that is at least twice the number of winding slots per pole-pair.

'Phase' is not a term that is generally used for DC windings and is used herein in the manner that is commonly used for AC windings. The phase angle of a winding slot is the position of the winding slot in relation to the fundamental waveform of the magnetic field and is generally expressed in electrical degrees or electrical radians. Each coil of the armature winding will be placed in a respective pair of winding slots and the phase angle of each coil is therefore the average of the phase angles of the two winding slots. As used herein, coils that have different phase angles at any instant are said to form individual phases. As the magnetic field on the rotor moves past a coil its electrical phase will change and the electronic commutation will cause reversal of the current in that coil at a defined instant and this is referred to herein as a 'commutating event'.

The number of phases for the armature winding is at least twice the number of coils per pole-pair but in practice the number of phases may be significantly more. It is believed that the maximum number of phases achievable for any given armature winding is half the total number of coils. An armature winding having 144 coils could therefore have a maximum of 72 phases. If the same armature winding had 3 coils per pole-pair then it will be readily appreciated that there are 24 times more phases than coils per pole-pair.

Such an armature winding can be referred to as a 'distributed connection' armature winding because of the manner in which semiconductor power switching devices are connected to the winding. The armature winding provides a number of commutating events per pole-pair that is significantly more than the number of coils per pole-pair.

Each circuit of the armature winding includes a plurality of coils connected together in series. It will be readily appreciated that in the case where the armature winding is formed with more than one circuit then the total number of coils in the armature winding will be the sum of the number of coils in all of the individual circuits. In some arrangements then the coils in different circuits can be connected together in parallel, e.g. by the use of cross connectors.

Each circuit of the armature winding preferably defines a plurality of phase angles. The phase angles of successive coils in each circuit of the armature winding may be equally spaced throughout k×360 electrical degrees or unequally spaced throughout k×360 electrical degrees as required, where k is an integer greater than zero. This means that the coils in each circuit can be spaced (either equally or unequally) through 360 electrical degrees, 720 electrical degrees, 1080 electrical degrees etc.

In the case where the phase angles of successive coils are equally spaced then the phase angle $\theta$ in electrical degrees between successive coils of a particular circuit can be determined using the following equation:

$$\theta = k \times 360/s \text{ electrical degrees}$$

where s is the number of coils in the particular circuit and is preferably larger than the number of winding slots per pole-pair. For example, if k=1 and the particular circuit has 36 equally spaced coils then each coil can have a phase angle $\theta$=10 (or −10) electrical degrees or its equivalent.

Electronic commutation enables the use of alternative forms of armature winding in which the phase angles of successive coils in each circuit are not equally spaced. Moreover, the commutation process is not fixed by the spatial relationship between a commutator and the armature winding of the electrical machine and the switching of the coils forms a quite different sequence from the physical sequence of the coils around the armature.

The number of circuits and the number of coils within each circuit may be selected depending on the circumstances. The number of circuits may depend on the construction of the electrical machine such as the number of magnet poles and winding slots, for example. Physically large electrical machines may have six or more circuits.

Each circuit will normally contain the same number of coils but it is possible for the circuits to have a different number of coils in come circumstances.

The separation between adjacent coils can be selected to achieve a required phase angle and is preferably such that the net voltage around each circuit is zero at all times and there are no circulating currents. The coils in each circuit do not have to be separated from adjacent coils in the circuit by the same number of winding slots whether or not the successive coils have equally spaced phase angles.

Although the separation between adjacent coils is expressed herein as a number of winding slots, it will be readily appreciated that the separation of adjacent coils is simply the distance between the circumferential centre-line of a coil and the circumferential centre-line of the next and/or previous coil in the circuit. This can be expressed in other ways, such as a proportion of the pole pitch at the bore of the armature expressed in any convenient form such as a rational fraction or a decimal multiple, for example. Any reference to successive coils in a particular circuit means that the coils should be considered in sequential order running from the first coil to the last coil in the circuit.

Although the last coil will normally be connected to the first coil to form a closed loop, the separation of the last and first coils may be different from that between the first coil and the second coil, the second coil and the third coil and so on. In general, it is possible that there are irregular separations between all adjacent pairs of coils in each circuit. However, it will be readily appreciated that uniform separations will make it easier to construct the armature winding.

The armature winding may be used with any suitable electronic commutator circuit having any suitable number of switching stages that are connected between the armature winding and first and second DC terminals, for example. Each switching stage will typically include a first semiconductor power switching device having its anode connected to the first DC terminal and a second semiconductor power switching device having its cathode connected to the second DC terminal. The first and second semiconductor switching power devices may be thyristors or reverse blocking devices that are capable of being turned on and off by gate control (e.g. gate turn off thyristors or GTOs) as described in EP 1798847.

If a particular circuit includes s coils connected together in series then the electronic commutator circuit for that circuit may include s switching stages, each switching stage being connected between an adjacent pair of coils (i.e. a point of coil interconnection) and the first and second DC terminals. In this case the number of commutating events per pole-pair will be equal to the number of coils in each circuit. Fewer switching stages can be provided to reduce the total number of semiconductor power switching devices. For example, switching stages can be connected between every second or third coil. If a switching stage is only connected at every second coil interconnection then the number of commutating events per pole-pair will be reduced to s/2. If a switching stage is only connected at every third coil interconnection then the number of commutating events per pole-pair will be reduced to s/3 and so on.

The number of coils that are commutating at any instant during operation of the electrical machine is two times the number of circuits (before internal connection between circuits, if any) but this is increased if the number of switching stages is reduced by only connecting a switching stage between every second or third coil, for example. If a switching stage is only connected at every second coil interconnection then the number of coils that are commutating at any instant is four times the number of circuits (before internal connection between circuits, if any). If a switching stage is only connected at every third coil interconnection then the number of coils that are commutating at any instant is six times the number of circuits (before internal connection between circuits, if any) and so on.

The individual circuits will normally be connected together to form the complete armature winding but may also be arranged to operate independently to provide redundancy and hence operational advantages. Each circuit may include its own network-side inverter to interface the circuit and its associated electronic commutator circuit to an AC supply network or bus.

The individual circuits can be connected externally (e.g. at the DC side of the electronic commutator circuit or at the AC side of the associated inverter) or internally. Any suitable method of external or internal connection can be used. For example, when the external connection is made at the DC side of the electronic commutator circuit then the circuits can be connected in series, parallel or an appropriate combination of both. When necessary, the electronic commutation circuits would include components to limit any circulating currents to an acceptable level. When the connection is made internally then a parallel connection between two or more circuits can be achieved by adding interconnections or cross connections between all of the respective points of coil interconnection or only between those respective points of coil interconnection to which a switching stage is connected, for example.

The individual coils of the armature winding can be of any suitable type or construction.

The armature winding can be used with a DC rotating or linear electrical machine that employs electronic commutation. The electrical machine can be excited by any suitable means (i.e. have any suitable field means) and the type of excitation has no effect on the operation and benefits of the armature winding. The electronic commutator circuit can therefore be used with electrical machines with slip rings or brushless field systems, with conventional or high temperature superconducting or low temperature superconducting field windings, with permanent magnet rotors, in radial, axial and transverse flux orientation and in conventional, inside-out and double sided configurations.

In the case of a DC rotating electrical machine that employs electronic commutation then the armature will normally be the stator (i.e. the coils of the armature winding will be received in suitably shaped winding slots formed in the radially inner or radially outer surface of the stator). However it is also possible for the armature winding to be the rotor in some circumstances.

When single-layer coils are used the armature winding will preferably include p coils received in 2p winding slots provided in the stator of the electrical machine. When two-layer coils are used then the armature winding will preferably include 2p coils received in 2p winding slots provided in the stator of the electrical machine.

BRIEF DESCRIPTION OF THE DRAWINGS

FIG. 2 shows a table illustrating a distributed connection armature winding according to one or more embodiments.

FIG. 3 shows a table illustrating an alternative distributed connection armature winding according to one or more embodiments.

Figure 1:
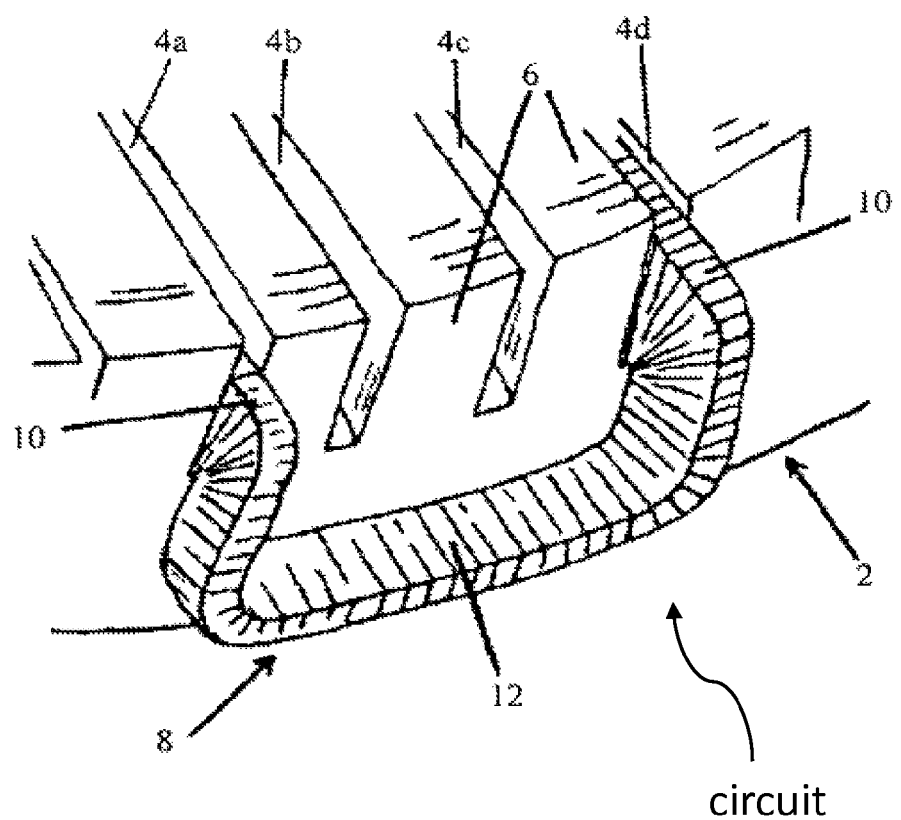
FIG. 1 shows part of an armature winding for a rotating electrical machine according to one or more embodiments.

Exemplary embodiments of the invention will now be described, with reference to the accompanying drawings, in which:

DETAILED DESCRIPTION OF THE PREFERRED EMBODIMENTS

With reference to FIG. 1, the stator 2 of a low-speed large-diameter electrical generator contains 288 equally spaced winding slots 4a-4d formed in its inner surface. Each winding slot contains a portion of a distributed connection armature winding that includes 144 coils (i.e. p=144). The winding slots 4a-4d are separated by teeth 6.

The coil 8 shown in FIG. 1 is a single-layer coil (also known as a 'concentric' coil) that is formed from one or more insulated conductors as a complete loop and has several turns. The coil 8 includes axially-extending runs 10 that are located in a corresponding pair of winding slots 4a, 4d and endwindings 12 that protrude out of the ends of the stator 2. The distributed connection armature winding may be a two-tier or three-tier winding where the endwindings of the coils forming the inner tier or tiers (i.e. the tier or tiers closest to the end of the stator) are bent away from the axis of the stator by up to 90 degrees so that they may pass over the coils forming the outer tier or tiers. The endwindings of the coils forming the outermost tier do not need to pass over other coils and can be substantially parallel to the axis of the stator or bent away from the axis of the stator by up to 90 degrees. In practice, it will be readily appreciated that the distributed connection armature winding can use any suitable type of coil. In addition to the single-layer, multiple-turn coils mentioned above, these include single-layer, single-turn coils; two-layer coils with a single turn or multiple turns per coil; single- and two-layer round wire coils (also known as 'mush' coils); bar windings; and lap and wave windings, for example. The armature winding shown in FIG. 1 has one coil in each group but other configurations are possible.

A rotor (not shown) is rotatably mounted within the stator 2 and has 88 magnet poles mounted around its outer rim. The electrical machine therefore has 44 pole-pairs. The magnet poles provide a magnet field that interacts with the armature winding in use. Other field means for providing a magnetic field can be provided on the rotor.

The number of coils per pole-pair for the electrical machine is 144/44 (i.e. n=p/44=144/44).

The number of winding slots per pole-pair for the electrical machine is 288/44. In practice, designs with a few as 5 slots per pole-pair are feasible and there is no upper limit. The angle between adjacent winding slots in the presence of the 44 pole-pair field (i.e. the winding slot pitch) is 55 electrical degrees.

As shown in FIG. 2, the distributed connection armature winding has four independent circuits, each circuit having 36 coils with identical sets of phase angles. The coils for each circuit are connected together in series and are distributed through the winding slots as shown in Table 1 therein where the coils in the first circuit are labelled A1, A2 ... A26, the coils in the second circuit are labelled B1, B2 ... B36 and so on. The distributed connection armature phase winding has 36 plates, which is significantly more than the number of coils per pole-pair (i.e., 144/44).

The winding slots 4a, 4d that receive the axially-extending runs of the coil shown in FIG. 1 are separated by two intermediate winding slots 4b, 4c (i.e. the coils have a 'pitch' of three winding slots). With reference to the first circuit, it can be seen that coil A1 is received in winding slots 1 and 4. This gives a pitch for coil A1 of 165 electrical degrees (i.e. 3×55=165 electrical degrees). Coil A2 is received in winding slots 27 and 30 and is therefore displaced by 26 slots from the coil A1. The electrical angle between the coils A1 and A2 is 1430 electrical degrees (i.e. 26×55=1430 electrical degrees) and this is equivalent to −10 electrical degrees. Coil A3 is received in winding slots 53 and 56 and is therefore displaced by 26 slots from the coil A2. The electrical angle between the coils A2 and A3 is 1430 electrical degrees and this is equivalent to −10 electrical degrees.

Successive coils A1 ... A36 in the first circuit are therefore displaced by 26 slots to give a retrogressive circuit with successive coils being separated by −10 electrical degrees.

Coil A36 is received in winding slots 47 and 50 and is connected to coil A1 to form a closed-loop. Coils A36 and A1 are separated by 46 slots in the reverse direction and the electrical angle between them is −2530 degrees (46×−55=−2530) electrical degrees and this is equivalent to −10 electrical degrees. The coils A1 ... A36 in the first circuit are therefore separated from adjacent coils by a number of slots that is significantly more than the number of winding slots per pole-pair (i.e. 288/44).

With reference to the second circuit, it can be seen that coil B1 is received in winding slots 73 and 76. This gives a pitch for coil B1 of 165 electrical degrees (i.e. 3×55=165 electrical degrees). Coil B2 is received in winding slots 99 and 102 and is therefore displaced by 26 slots from the coil B1. The electrical angle between the coils B1 and B2 is 1430 electrical degrees (i.e. 26×55=1430 electrical degrees) and this is equivalent to −10 electrical degrees. Coil B3 is received in winding slots 125 and 128 and is therefore displaced by 26 slots from the coil B2. The electrical angle between the coils B2 and B3 is 1430 electrical degrees and this is equivalent to −10 electrical degrees.

Successive coils B1 ... B36 in the second circuit are therefore displaced by 26 slots to give a retrogressive circuit with successive coils being separated by −10 electrical degrees.

Coil B36 is received in winding slots 119 and 122 and is connected to coil B1 to form a closed-loop. Coils B36 and B1 are separated by 46 slots in the reverse direction and the electrical angle between them is −2530 degrees (46×−55=−2530) electrical degrees and this is equivalent to −10 electrical degrees. The coils B1 ... B36 in the second circuit are therefore separated from adjacent coils by a number of slots that is significantly more than the number of winding slots per pole-pair (i.e. 288/44).

The third and fourth circuits are formed in a similar manner.

Each circuit contains 36 coils (i.e. s=36) defining 36 phase angles with equally spaced electrical angles between 0 and 360 electrical degrees and as a result the net voltage around each circuit is zero at all times and there are no circulating currents. Each circuit extends slightly more than three times around the circumference of the stator.

The number of independent circuits and the number of coils in each circuit will depend on the number of poles and the number of winding slots of the electrical machine.

The coils of each circuit are connected in series and each circuit has 36 points of coil interconnection (i.e. the interconnections between adjacent pairs of coils). Although not shown, an electronic commutator circuit may include 36 switching stages, each switching stage being connected between a respective one of the points of coil interconnection and first and second DC terminals. Each switching stage will typically include a first semiconductor power switching device having its anode connected to the first DC terminal and a second semiconductor power switching device having its cathode connected to the second DC terminal. The first and second semiconductor power switching devices may be thyristors or reverse blocking devices that are capable of being turned on and off by gate control (e.g. gate turn off thyristors or GTOs) as described in EP 1798847. In practice, it will be readily appreciated that any suitable electronic commutator circuit can be used. Alternative arrangements would have a switching stage between every second or third coil to reduce the total number of semiconductor power switching devices.

The four independent circuits may be connected together to form the complete distributed connection armature winding. The circuits can be connected externally at the DC side of the electronic commutator circuits or at the AC side of any associated inverters (not shown). The circuits can also be connected internally. Any suitable method of external or internal connection can be used. For example, when the external connection is made at the DC side of the electronic commutator circuit then the circuits can be connected in series, parallel or an appropriate combination of both. When necessary, the electronic commutation circuits would include components to limit any circulating current to an acceptable level. When the connection is made internally then a parallel connection between two or more circuits can be achieved by adding interconnections between all of the respective points of coil interconnection or only between those respective points of coil interconnection to which a switching stage is connected. It is also possible for coils in two or more circuits to be connected together in series. For example, coils A1 and B1 can be connected in series, coils A2 and B2 can be connected in series, coils A3 and B3 can be connected in series and so on, followed by connecting coils A2 and B1 in series, coils A3 and B2 in series, coils A4 and B3 in series and so on. This would result in a single circuit with twice the voltage.

It can be seen from Table 1 of FIG. 2 that the circuits are interleaved and that each circuit extends slightly more than three times around the circumference of the stator. An alternative (or 'concentrated') distributed connection armature winding is shown in Table 2 of FIG. 3 where each circuit is concentrated on a portion of the stator circumference. For an armature winding having four circuits, each circuit may be concentrated on approximately a quarter of the stator circumference, there will be a slight overlap of circuits at the ends and the extent of this depends on the pitch of the coils.

Coil A1 is received in winding slots 1 and 4. This gives a pitch for coil A1 of 165 electrical degrees (i.e. 3×55=165 electrical degrees). Coil A2 is received in winding slots 27 and 30 and is therefore displaced by 26 slots from the coil A1. The electrical angle between the coils A1 and A2 is 1430 electrical degrees (i.e. 26×55=1430 electrical degrees) and this is equivalent to −10 electrical degrees. Coil A3 is received in winding slots 53 and 56 and is therefore displaced by 26 slots from the coil A2. The electrical angle between the coils A2 and A3 is 1430 electrical degrees and this is equivalent to −10 electrical degrees. If each circuit is allocated a quarter of the slots then it will be readily appreciated that the first circuit is to be concentrated in slots 1 to 72. Coil A4 is received in winding slots 7 and 10 and is therefore displaced by 26 slots from the coil A3 (i.e. slots 53 to 72 and 1 to 7). The electrical angle between coils A3 and A4 is 1430 electrical degrees and this is equivalent to −10 electrical degrees.

Successive coils A1 . . . A36 in the first circuit are therefore displaced by 26 slots to give a retrogressive circuit with successive coils being separated by −10 electrical degrees and concentrated in approximately a quarter of the stator circumference. The only overlap is with coil A12 where one of the axially-extending runs is received in winding slot 74.

Coil A36 is received in winding slots 47 and 50 and is connected to coil A1 to form a closed-loop. Coils A36 and A1 separated by 46 slots in the reverse direction and the electrical angle between them is −2530 degrees (46×−55=−2530) electrical degrees and this is equivalent to −10 electrical degrees. The coils A1 . . . A36 in the first circuit are therefore separated from adjacent coils by a number of slots that is significantly more than the number of winding slots per pole-pair (i.e. 288/44).

With reference to the second circuit, coil B1 is received in winding slots 73 and 76. This gives a pitch for coil B1 of 165 electrical degrees (i.e. 3×55=165 electrical degrees). Coil B2 is received in winding slots 99 and 102 and is therefore displaced by 26 slots from the coil B1. The electrical angle between the coils B1 and B2 is 1430 electrical degrees (i.e. 26×55=1430 electrical degrees) and this is equivalent to −10 electrical degrees. Coil B3 is received in winding slots 125 and 128 and is therefore displaced by 26 slots from the coil B2. The electrical angle between the coils B2 and B3 is 1430 electrical degrees and this is equivalent to −10 electrical degrees. If each circuit is allocated a quarter of the slots then it will be readily appreciated that the second circuit is to be concentrated in slots 73 to 144. Coil B4 is received in winding slots 79 and 82 and is therefore displaced by 26 slots from the coil B3 (i.e. slots 125 to 144 and 73 to 79). The electrical angle between coils B3 and B4 is 1430 electrical degrees and this is equivalent to −10 electrical degrees.

Successive coils B1 . . . B36 in the second circuit are therefore displaced by 26 slots to give a retrogressive circuit with successive coils being separated by −10 electrical degrees and concentrated in approximately a quarter of the stator circumference. The only overlap is with coil B12 where one of the axially-extending runs is received in winding slot 146.

Coil B36 is received in winding slots 119 and 122 and is connected to coil B1 to form a closed-loop. Coils B36 and B1 are separated by 46 slots in the reverse direction and the electrical angle between them is −2530 degrees (46×−55=−2530) electrical degrees and this is equivalent to −10 electrical degrees. The coils B1 . . . B36 in the second circuit are therefore separated from adjacent coils by a number of slots that is significantly more than the number of winding slots per pole-pair (i.e. 288/44).

The third and fourth circuits are formed in a similar manner and are concentrated in slots 145 to 216 and 217 to 288, respectively.

Each circuit contains 36 coils defining 36 phase angles with equally spaced electrical angles between 0 and 360 electrical degrees and as a result the net voltage around each circuit is zero at all times and there are no circulating currents.

In examples described above, the number of winding slots per pole-pair is 288/44 and the number of coils per pole-pair is 144/44. The distributed connection armature windings shown in Tables 1 and 2 have 36 phases and this is significantly more than the number of coils per pole-pair. If the electronic commutator circuit has 36 switching stages then the distributed connection armature winding will provide 36 commutating events per pole-pair. This is also significantly more than the number of coils per pole-pair.

A DC electrical machine that incorporates a distributed connection armature winding will have significantly less torque ripple than a similar size machine with fewer phases and fewer commutating events per pole-pair.

TABLE 1

Distributed connection armature winding

| Coil | Slots | | Coil | Slots | | Coil | Slots | | Coil | Slots | |
|---|---|---|---|---|---|---|---|---|---|---|---|
| A1 | 1 | 4 | B1 | 73 | 76 | C1 | 145 | 148 | D1 | 217 | 220 |
| A2 | 27 | 30 | B2 | 99 | 102 | C2 | 171 | 174 | D2 | 243 | 246 |
| A3 | 53 | 56 | B3 | 125 | 128 | C3 | 197 | 200 | D3 | 269 | 272 |
| A4 | 79 | 82 | B4 | 151 | 154 | C4 | 223 | 226 | D4 | 7 | 10 |
| A5 | 105 | 108 | B5 | 177 | 180 | C5 | 249 | 252 | D5 | 33 | 36 |
| A6 | 131 | 134 | B6 | 203 | 206 | C6 | 275 | 278 | D6 | 59 | 62 |
| A7 | 157 | 160 | B7 | 229 | 232 | C7 | 13 | 16 | D7 | 85 | 88 |
| A8 | 183 | 186 | B8 | 255 | 258 | C8 | 39 | 42 | D8 | 111 | 114 |
| A9 | 209 | 212 | B9 | 281 | 284 | C9 | 65 | 68 | D9 | 137 | 140 |
| A10 | 235 | 238 | B10 | 19 | 22 | C10 | 91 | 94 | D10 | 163 | 166 |
| A11 | 261 | 264 | B11 | 45 | 48 | C11 | 117 | 120 | D11 | 189 | 192 |
| A12 | 287 | 2 | B12 | 71 | 74 | C12 | 143 | 146 | D12 | 215 | 218 |
| A13 | 25 | 28 | B13 | 97 | 100 | C13 | 169 | 172 | D13 | 241 | 244 |
| A14 | 51 | 54 | B14 | 123 | 126 | C14 | 195 | 198 | D14 | 267 | 270 |
| A15 | 77 | 80 | B15 | 149 | 152 | C15 | 221 | 224 | D15 | 5 | 8 |
| A16 | 103 | 106 | B16 | 175 | 178 | C16 | 247 | 250 | D16 | 31 | 34 |
| A17 | 129 | 132 | B17 | 201 | 204 | C17 | 273 | 276 | D17 | 57 | 60 |
| A18 | 155 | 158 | B18 | 227 | 230 | C18 | 11 | 14 | D18 | 83 | 86 |
| A19 | 181 | 184 | B19 | 253 | 256 | C19 | 37 | 40 | D19 | 109 | 112 |
| A20 | 207 | 210 | B20 | 279 | 282 | C20 | 63 | 66 | D20 | 135 | 138 |
| A21 | 233 | 236 | B21 | 17 | 20 | C21 | 89 | 92 | D21 | 161 | 164 |
| A22 | 259 | 262 | B22 | 43 | 46 | C22 | 115 | 118 | D22 | 187 | 190 |
| A23 | 285 | 288 | B23 | 69 | 72 | C23 | 141 | 144 | D23 | 213 | 216 |
| A24 | 23 | 26 | B24 | 95 | 98 | C24 | 167 | 170 | D24 | 239 | 242 |
| A25 | 49 | 52 | B25 | 121 | 124 | C25 | 193 | 196 | D25 | 265 | 268 |
| A26 | 75 | 78 | B26 | 147 | 150 | C26 | 219 | 222 | D26 | 3 | 6 |
| A27 | 101 | 104 | B27 | 173 | 176 | C27 | 245 | 248 | D27 | 29 | 32 |
| A28 | 127 | 130 | B28 | 199 | 202 | C28 | 271 | 274 | D28 | 55 | 58 |
| A29 | 153 | 156 | B29 | 225 | 228 | C29 | 9 | 12 | D29 | 81 | 84 |
| A30 | 179 | 182 | B30 | 251 | 254 | C30 | 35 | 38 | D30 | 107 | 110 |
| A31 | 205 | 208 | B31 | 277 | 280 | C31 | 61 | 64 | D31 | 133 | 136 |
| A32 | 231 | 234 | B32 | 15 | 18 | C32 | 87 | 90 | D32 | 159 | 162 |
| A33 | 257 | 260 | B33 | 41 | 44 | C33 | 113 | 116 | D33 | 185 | 188 |
| A34 | 283 | 286 | B34 | 67 | 70 | C34 | 139 | 142 | D34 | 211 | 214 |
| A35 | 21 | 24 | B35 | 93 | 96 | C35 | 165 | 168 | D35 | 237 | 240 |
| A36 | 47 | 50 | B36 | 119 | 122 | C36 | 191 | 194 | D36 | 263 | 266 |

TABLE 2

Alternative distributed connection armature winding

| Coil | Slots | | Coil | Slots | | Coil | Slots | | Coil | Slots | |
|---|---|---|---|---|---|---|---|---|---|---|---|
| A1 | 1 | 4 | B1 | 73 | 76 | C1 | 145 | 148 | D1 | 217 | 220 |
| A2 | 27 | 30 | B2 | 99 | 102 | C2 | 171 | 174 | D2 | 243 | 246 |
| A3 | 53 | 56 | B3 | 125 | 128 | C3 | 197 | 200 | D3 | 269 | 272 |
| A4 | 7 | 10 | B4 | 79 | 82 | C4 | 151 | 154 | D4 | 223 | 226 |
| A5 | 33 | 36 | B5 | 105 | 108 | C5 | 177 | 180 | D5 | 249 | 252 |
| A6 | 59 | 62 | B6 | 131 | 134 | C6 | 203 | 206 | D6 | 275 | 278 |
| A7 | 13 | 16 | B7 | 85 | 88 | C7 | 157 | 160 | D7 | 229 | 232 |
| A8 | 39 | 42 | B8 | 111 | 114 | C8 | 183 | 186 | D8 | 255 | 258 |
| A9 | 65 | 68 | B9 | 137 | 140 | C9 | 209 | 212 | D9 | 281 | 284 |
| A10 | 19 | 22 | B10 | 91 | 94 | C10 | 163 | 166 | D10 | 235 | 238 |
| A11 | 45 | 48 | B11 | 117 | 120 | C11 | 189 | 192 | D11 | 261 | 264 |
| A12 | 71 | 74 | B12 | 143 | 146 | C12 | 215 | 218 | D12 | 287 | 2 |
| A13 | 25 | 28 | B13 | 97 | 100 | C13 | 169 | 172 | D13 | 241 | 244 |
| A14 | 51 | 54 | B14 | 123 | 126 | C14 | 195 | 198 | D14 | 267 | 270 |
| A15 | 5 | 8 | B15 | 77 | 80 | C15 | 149 | 152 | D15 | 221 | 224 |
| A16 | 31 | 34 | B16 | 103 | 106 | C16 | 175 | 178 | D16 | 247 | 250 |
| A17 | 57 | 60 | B17 | 129 | 132 | C17 | 201 | 204 | D17 | 273 | 276 |
| A18 | 11 | 14 | B18 | 83 | 86 | C18 | 155 | 158 | D18 | 227 | 230 |
| A19 | 37 | 40 | B19 | 109 | 112 | C19 | 181 | 184 | D19 | 253 | 256 |
| A20 | 63 | 66 | B20 | 135 | 138 | C20 | 207 | 210 | D20 | 279 | 282 |
| A21 | 17 | 20 | B21 | 89 | 92 | C21 | 161 | 164 | D21 | 233 | 236 |
| A22 | 43 | 46 | B22 | 115 | 118 | C22 | 187 | 190 | D22 | 259 | 262 |
| A23 | 69 | 72 | B23 | 141 | 144 | C23 | 213 | 216 | D23 | 285 | 288 |
| A24 | 23 | 26 | B24 | 95 | 98 | C24 | 167 | 170 | D24 | 239 | 242 |
| A25 | 49 | 52 | B25 | 121 | 124 | C25 | 193 | 196 | D25 | 265 | 268 |
| A26 | 3 | 6 | B26 | 75 | 78 | C26 | 147 | 150 | D26 | 219 | 222 |
| A27 | 29 | 32 | B27 | 101 | 104 | C27 | 173 | 176 | D27 | 245 | 248 |
| A28 | 55 | 58 | B28 | 127 | 130 | C28 | 199 | 202 | D28 | 271 | 274 |
| A29 | 9 | 12 | B29 | 81 | 84 | C29 | 153 | 156 | D29 | 225 | 228 |
| A30 | 35 | 38 | B30 | 107 | 110 | C30 | 179 | 182 | D30 | 251 | 254 |
| A31 | 61 | 64 | B31 | 133 | 136 | C31 | 205 | 208 | D31 | 277 | 280 |
| A32 | 15 | 18 | B32 | 87 | 90 | C32 | 159 | 162 | D32 | 231 | 234 |
| A33 | 41 | 44 | B33 | 113 | 116 | C33 | 185 | 188 | D33 | 257 | 260 |
| A34 | 67 | 70 | B34 | 139 | 142 | C34 | 211 | 214 | D34 | 283 | 286 |
| A35 | 21 | 24 | B35 | 93 | 96 | C35 | 165 | 168 | D35 | 237 | 240 |
| A36 | 47 | 50 | B36 | 119 | 122 | C36 | 191 | 194 | D36 | 263 | 266 |

What is claimed is:

1. A DC electrical machine comprising:
    an armature having a non-integer number of winding slots per pole-pair of a magnetic field of a field means, each winding slot having a phase angle, wherein the phase angle is electrical and is a position of the winding slot in relation to a fundamental waveform of the magnetic field; and
    a DC armature winding that in use interacts with the magnetic field, the armature winding comprising one or more circuits with each circuit including a plurality of coils; wherein each coil of the armature winding is received in a pair of winding slots;
    wherein each coil of the armature winding has a phase angle that is the average of the phase angles of the pair of winding slots in which the respective coil is received, and the coils in each circuit that have different phase angles at any instant form different phases for the armature winding, the number of different phases for the armature winding being at least twice the number of coils per pole-pair; and
    wherein the coils in each circuit are connected together in series in the sequence of their phase angles and are separated from adjacent coils in the same circuit by a number of winding slots that is at least twice the number of winding slots per pole-pair.

2. The electrical machine of claim 1, wherein the phase angles of successive coils in each circuit of the armature winding are equally spaced throughout k×360 electrical degrees, where k is an integer greater than zero.

3. The electrical machine of claim 1, wherein the phase angles of successive coils in each circuit of the armature winding are unequally spaced throughout k×360 electrical degrees, where k is an integer greater than zero.

4. The electrical machine of claim 1, wherein the armature is a stator having 2p winding slots and the armature winding is a single-layer armature winding having p coils where p represents a number of coils and is greater than 0.

5. The electrical machine of claim 1, wherein the armature is a stator having 2p winding slots and the armature winding is a two-layer armature winding having 2p coils where p represents a number of coils and is greater than 0.

6. A DC electrical machine comprising:
an armature, comprising an armature winding, and a plurality of winding slots per pole-pair, each winding slot having an electrical phase angle corresponding to a position of the winding slot in relation to a waveform of a magnetic field interacting with the armature winding therethrough; and
the armature winding comprising one or more circuits with each circuit including a plurality of coils, each coil of the armature winding is received in a pair of winding slots spaced apart,
wherein each coil of the armature winding has an electrical phase angle that is the average of the electrical phase angles of the pair of winding slots in which the respective coil is received and the coils in each circuit are connected together in series in the sequence of their respective electrical phase angles and are separated from adjacent coils in the same circuit by a number of winding slots that is at least twice the number of winding slots per pole-pair, and a number of commutation events during time taken for relative movement between the DC armature winding and the magnetic field of one pole-pair is larger than the number of coils per pole-pair.

7. The electrical machine of claim 6, wherein the phase angles of successive coils in each circuit of the armature winding are equally spaced throughout k×360 electrical degrees, where k is an integer greater than zero.

8. The electrical machine of claim 6, wherein the phase angles of successive coils in each circuit of the armature winding are unequally spaced throughout k×360 electrical degrees, where k is an integer greater than zero.

9. The electrical machine of claim 6, wherein the armature is a stator having 2p winding slots and the armature winding is a single-layer armature winding having p coils where p represents a number of coils and is greater than 0.

10. The electrical machine of claim 6, wherein the armature is a stator having 2p winding slots and the armature winding is a two-layer armature winding having 2p coils where p represents a number of coils and is greater than 0.

* * * * *